United States Patent
Karuppoor et al.

(10) Patent No.: US 11,141,787 B2
(45) Date of Patent: Oct. 12, 2021

(54) CONCURRENT, LAYER-BY-LAYER POWDER AND MOLD FABRICATION FOR MULTI-FUNCTIONAL PARTS

(71) Applicant: Schlumberger Technology Corporation, Sugar Land, TX (US)

(72) Inventors: Srinand Karuppoor, Sugar Land, TX (US); Manuel Marya, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 199 days.

(21) Appl. No.: 16/156,926

(22) Filed: Oct. 10, 2018

(65) Prior Publication Data
US 2020/0114427 A1    Apr. 16, 2020

(51) Int. Cl.
*B22F 3/12* (2006.01)
*B22F 3/15* (2006.01)
(Continued)

(52) U.S. Cl.
CPC .............. *B22F 3/1283* (2013.01); *B22F 3/15* (2013.01); *B29C 64/118* (2017.08); *B33Y 10/00* (2014.12);
(Continued)

(58) Field of Classification Search
CPC ...... B22F 3/1283; B22F 3/15; B22F 2207/01; B22F 2003/1056; B22F 2998/10;
(Continued)

(56) References Cited

U.S. PATENT DOCUMENTS

| 5,204,055 A | 4/1993 | Sachs et al. |
| 6,353,771 B1 | 3/2002 | Southland |

(Continued)

FOREIGN PATENT DOCUMENTS

| GB | 2490087 A | 10/2012 |
| GB | 2490299 A | 10/2012 |

(Continued)

OTHER PUBLICATIONS

Smart Material from Wikipedia, https://en.wikipedia.org/wiki/Smart_material, downloaded on May 6, 2021 (3 pages).
(Continued)

*Primary Examiner* — Rebecca Janssen
(74) *Attorney, Agent, or Firm* — Jaime Castano

(57) ABSTRACT

The present disclosure provides for a method of making a part using powder metallurgy and material extrusion. The method includes forming a mold of a first material using material extrusion. The method includes depositing a second material within the mold. The second material is deposited as a powder. The method includes compacting the second material within the mold, and heating the mold and the second material within the mold. During the heating, the mold is separated from the material by melting, evaporating, or burning of the first material, and the second material is sintered. Also provided for are parts made by the method and a system for making such parts. The system includes a material extrusion head and a powder deposition head. Each head is articulable along three axes.

20 Claims, 7 Drawing Sheets

(51) Int. Cl.
*B29C 64/118* (2017.01)
*B33Y 10/00* (2015.01)
*B33Y 30/00* (2015.01)
*B33Y 80/00* (2015.01)
*B29L 31/00* (2006.01)

(52) U.S. Cl.
CPC ............... *B33Y 30/00* (2014.12); *B33Y 80/00* (2014.12); *B29L 2031/757* (2013.01)

(58) Field of Classification Search
CPC .... B22F 3/1055; B22F 2999/00; B22F 5/007; B22F 12/00; B22F 10/20; B29C 64/118; B29C 64/188; B29C 64/255; B29C 64/295; B29C 64/393; B29C 64/209; B33Y 30/00; B33Y 80/00; B33Y 10/00; B33Y 70/10; B33Y 50/02; B29L 2031/757; Y02P 10/25
See application file for complete search history.

(56) References Cited

U.S. PATENT DOCUMENTS

| | | | |
|---|---|---|---|
| 7,461,684 B2 | 12/2008 | Liu et al. | |
| 7,832,457 B2 | 11/2010 | Calnan et al. | |
| 8,374,835 B2 | 2/2013 | Lind et al. | |
| 2003/0094730 A1 | 5/2003 | Dourfaye et al. | |
| 2007/0181224 A1* | 8/2007 | Marya | C22C 30/06 148/400 |
| 2013/0310961 A1 | 11/2013 | Intriago Velez | |
| 2020/0269320 A1* | 8/2020 | Ben-Zur | B22F 7/02 |
| 2020/0338818 A1* | 10/2020 | Teng | B33Y 80/00 |

FOREIGN PATENT DOCUMENTS

| | | |
|---|---|---|
| WO | 2006049619 A1 | 5/2006 |
| WO | 2009017648 A1 | 2/2009 |
| WO | WO2012073089 A1 | 6/2012 |

OTHER PUBLICATIONS

Wen et al., 2002, Piezoelectric cement-based materials with large coupling and voltage coefficients, Cement and Concrete Research 32, pp. 335-359 http://citeseerx.ist.psu.edu/viewdoc/download?doi=10.1.1.496.2883&rep=rep1&type=pdf.

Dong et al., Cement-based piezoelectric ceramic smart composites, Composites Science and Technology. vol. 65, Issue 9, Jul. 2005, pp. 1363-1371.

* cited by examiner

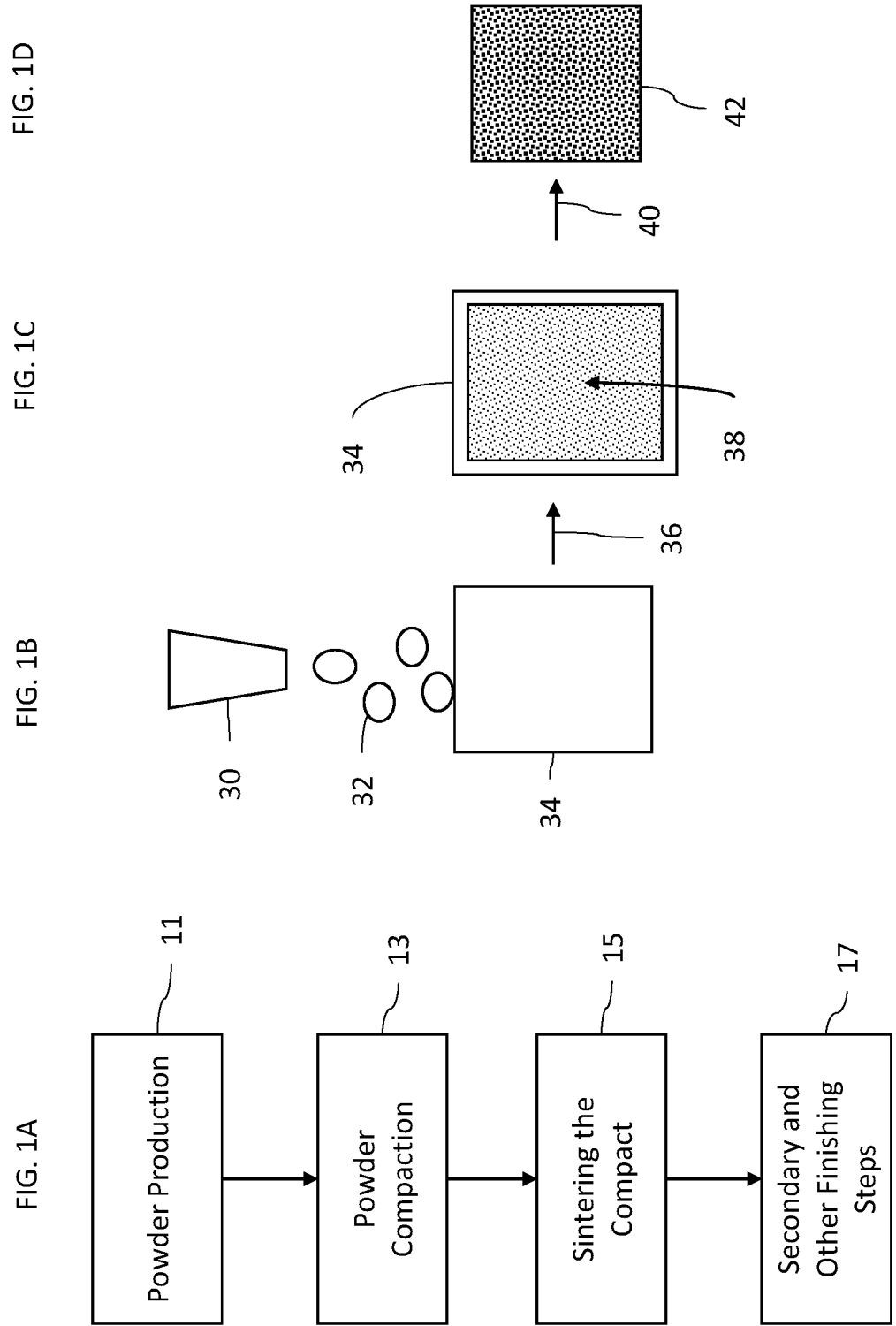

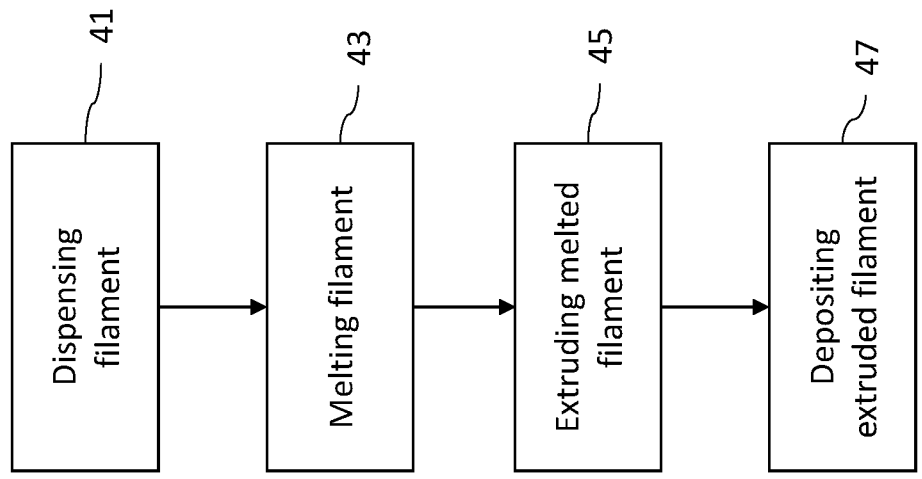
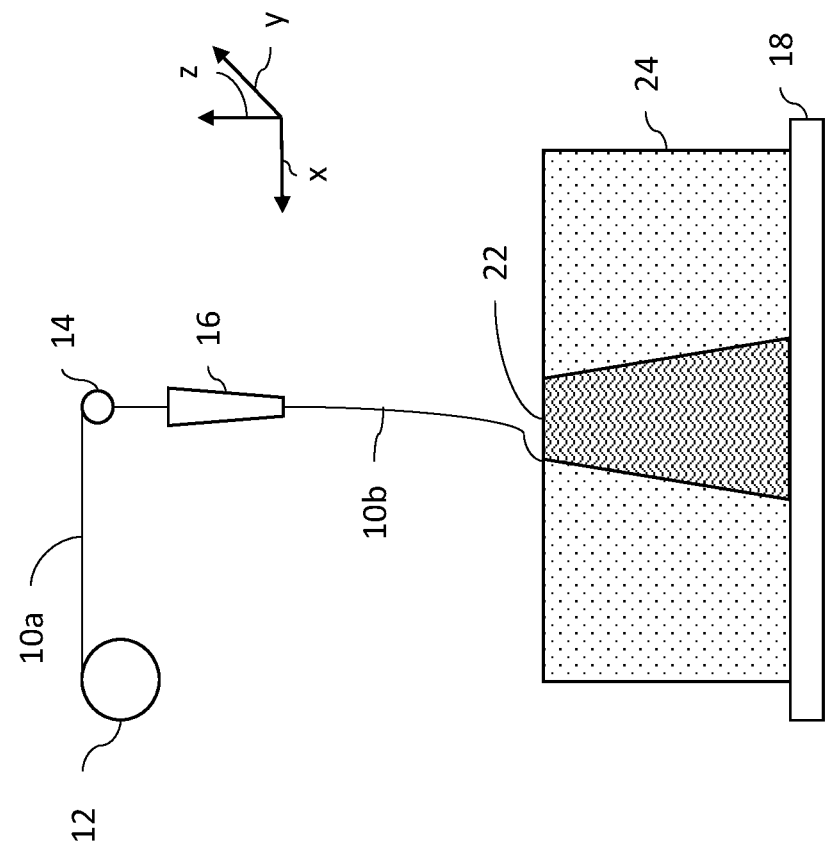

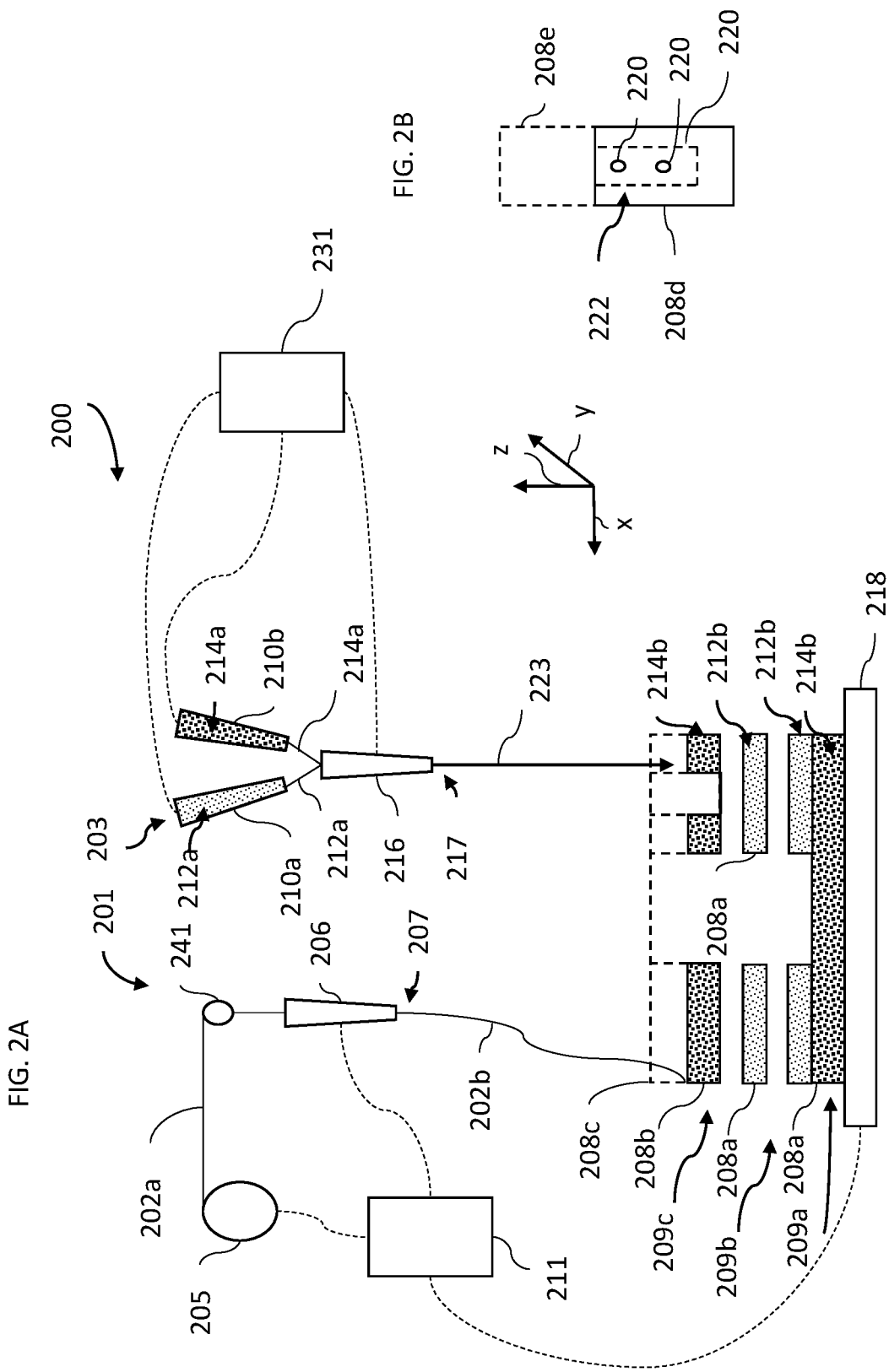

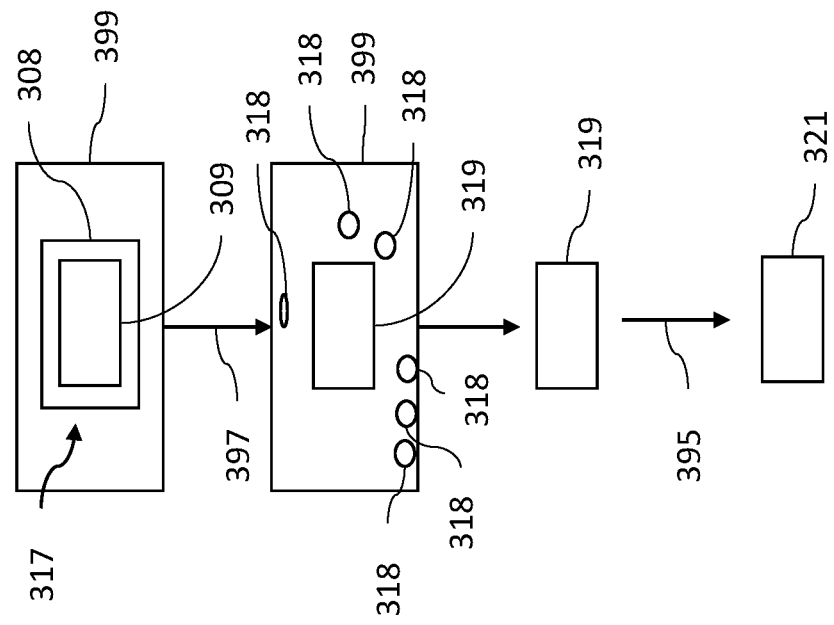
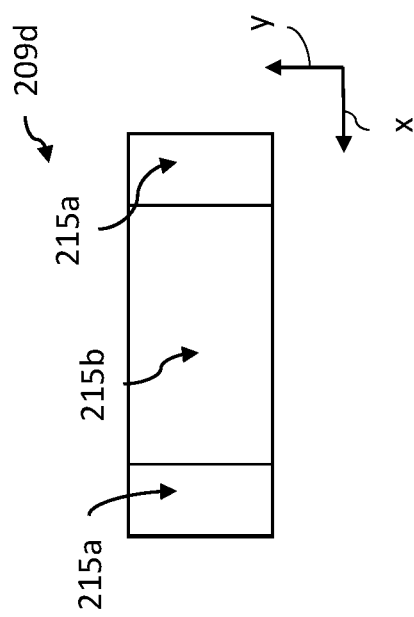

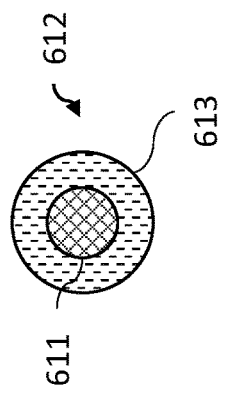
FIG. 6A
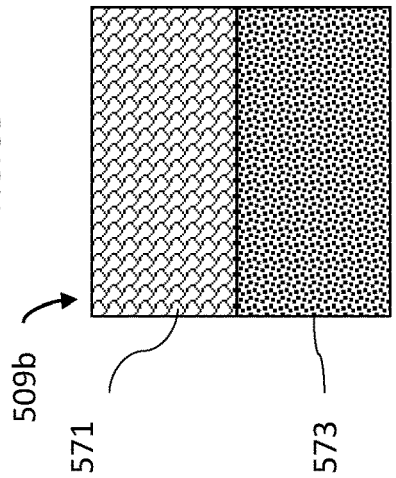
FIG. 6B
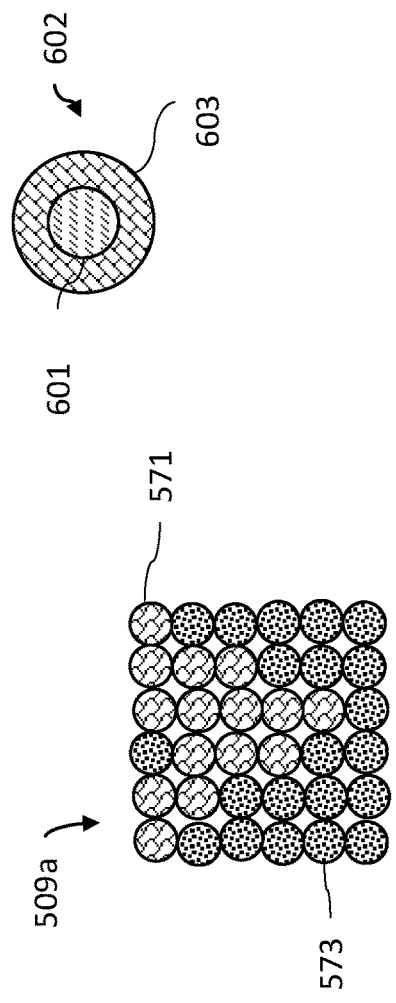
FIG. 5A
FIG. 5B
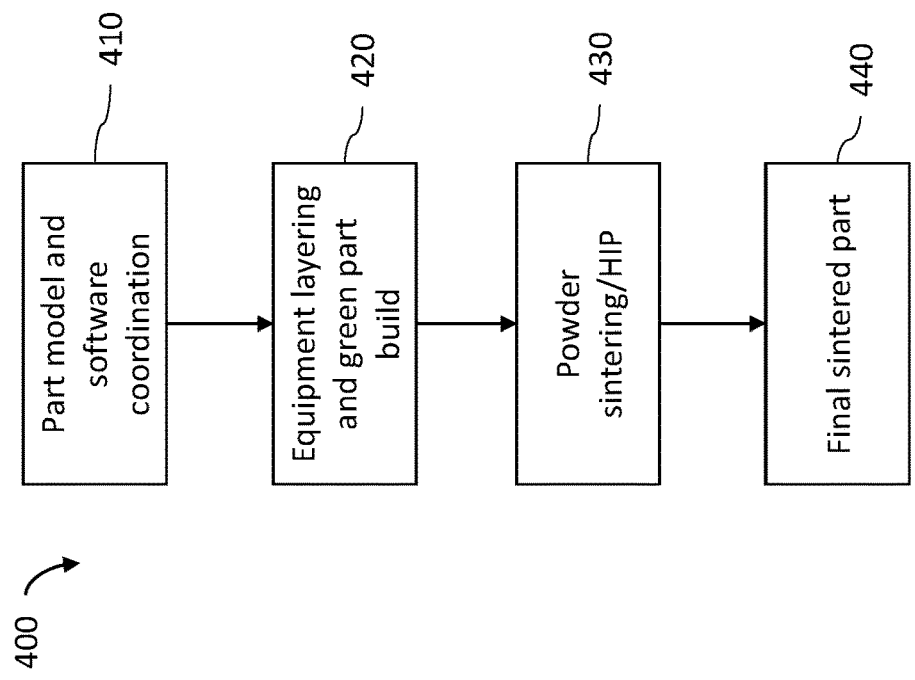
FIG. 4

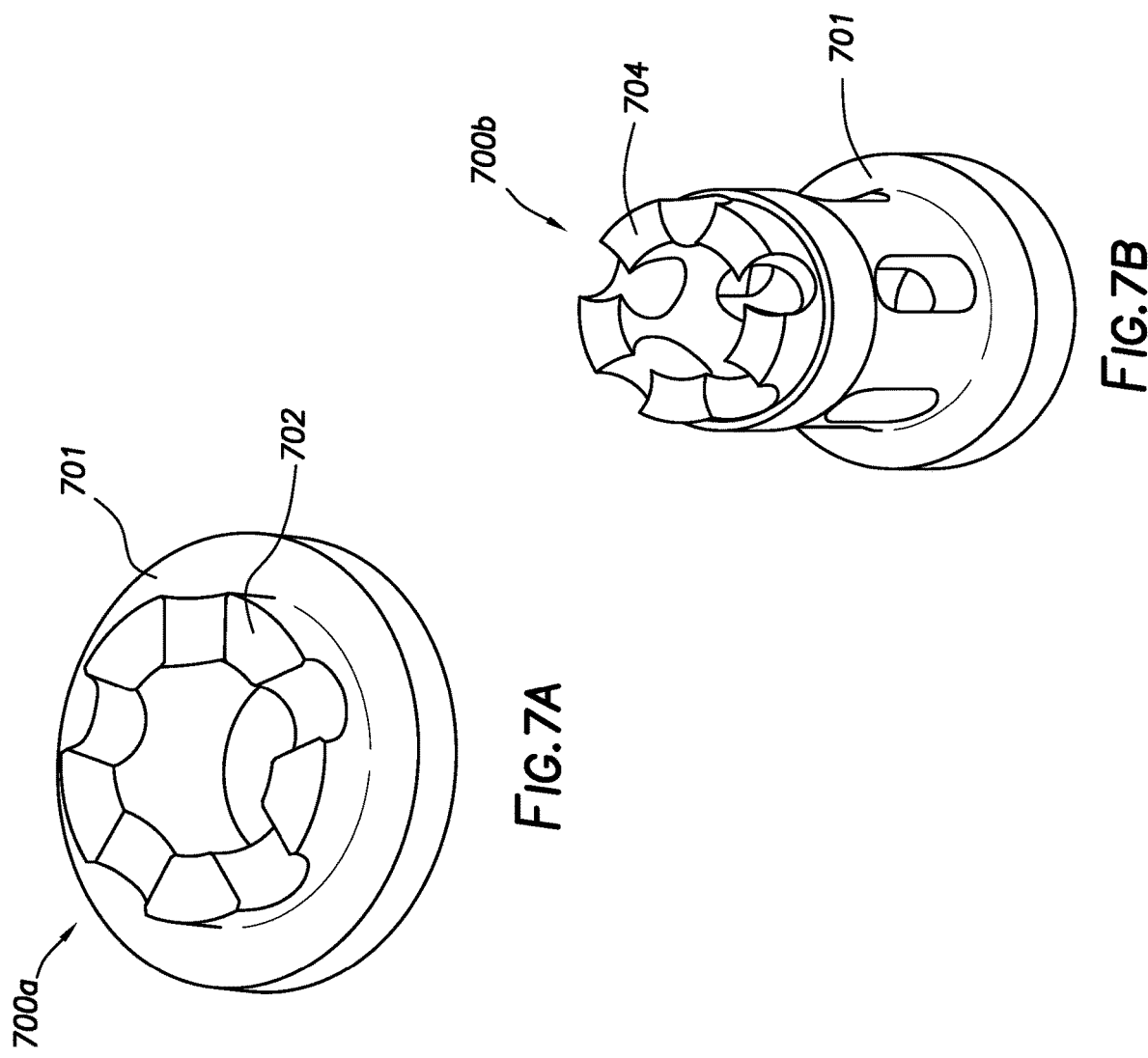

CONCURRENT, LAYER-BY-LAYER POWDER AND MOLD FABRICATION FOR MULTI-FUNCTIONAL PARTS

FIELD

The present disclosure relates to the use of powder metallurgy methods in conjunction with additive manufacturing methods, as well as to parts, including multi-functional parts, made thereby, apparatus and systems including such parts, and methods of using such parts, apparatus and systems.

BACKGROUND

Oilfield tools are subjected to relatively harsh operating conditions. Such tool components are typically required to fulfill multiple functionalities and/or exhibit multiple properties that provide suitability for operation in such harsh conditions, such as corrosion resistance, wear resistance, and the ability to bear relatively heavy loads and impacts. Typically, such tool components are composed of a base material that provides the tool components with the primary load-bearing functionality, as well as supplemental coatings (claddings) that provide the tool components with desired physical properties, such as wear-resistance (e.g., wear bands on drill collars).

Powder metallurgy is one of the most important and established manufacturing processes. Powder metallurgy typically includes the followings steps: (1) powder production; (2) powder compaction; (3) sintering of the compact; and (4) secondary and other finishing steps. As one skilled in the art would know, the details of the powder metallurgy processes and its uses are available in literature and books. See, e.g., Angelo, P. C. and Subramanian, R., Powder Metallurgy: Science, Technology, and Applications, PHI Learning Pvt. Ltd., 2008. Traditionally, compaction of the powder is performed in many different ways to provide the required shape to the resultant product. Typically, this involves pressing the powder with dies, isostatic compaction, centrifugal casting, cold isostatic pressing, or other methods known to those skilled in the art. In isostatic pressing, containers (i.e., molds) for the powders are typically made of a sheet metal having a relatively high ductility to account for the deformation of the container during the pressing process. Such sheet metal containers (metal shells) stay engaged on the surface of the pressed part (i.e., the part formed by compaction and sintering), requiring machining for removal of the sheet metal containers after formation of the part.

Material extrusion, in the additive manufacturing context, is a process in which a material is selectively dispensed through a nozzle or orifice head onto a build platform that is capable of moving in the x-y plane relative to the nozzle or orifice head. After formation of a layer is completed using the material extrusion process, either the nozzle or orifice head or the build platform is moved in the z-plane so that an additional layer can be formed over the first layer. This process is continued until the part is completely formed. The raw material in material extrusion is typically a filament of thermoplastic that is coiled onto a spool and is melted as the material is extruded through the nozzle or orifice head. Fusion between layers of the part occurs due to the overlay of the melt material of one layer upon the previous layer(s), which subsequently hardens to form a bond between the layers. Support structures or material are typically required to support the bottom or overhanging features of the part. The material extrusion process is commonly referred to as "3D printing". Recently, there has been a proliferation of 3D printing systems using material extrusion process technology in part because, in comparison to other additive manufacturing processes, such 3D printing systems are relatively inexpensive.

BRIEF SUMMARY

One embodiment of the present disclosure includes a method of making a part using powder metallurgy and material extrusion. The method includes forming a mold of a first material using material extrusion, and depositing a second material within the mold. The second material is deposited as a powder. The method includes compacting the second material within the mold, and heating the mold and the second material within the mold. During the heating, the mold is separated from the material by melting, evaporating, burning, or combinations thereof of the first material, and the second material is sintered. The method includes obtaining a part. Also provided for is a part made by the method.

Another embodiment of the present disclosure includes a system for making a part using powder metallurgy and material extrusion. The system includes a material extrusion head and a powder deposition head. The heads are each articulable along three axes.

BRIEF DESCRIPTION OF THE DRAWINGS

So that the manner in which the features of the compositions, articles, systems and methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 1A is a simplified flow chart showing steps of a powder metallurgy process.

FIG. 1B is side view depicting powder being deposited into a mold.

FIG. 1C is a top view of the mold of FIG. 1B showing compacted powder.

FIG. 1D is a top view of a part formed after sintering the compacted powder of FIG. 1C.

FIG. 1E is a simplified schematic of a material extrusion or fused deposition modelling system.

FIG. 1F is a simplified flow chart of a material extrusion or fused deposition modelling process.

FIG. 2A is a simplified schematic of a system, including both powder metallurgy and material extrusion apparatus, during concurrent manufacture of a mold and a part.

FIG. 2B depicts a mold including holes formed through a body thereof.

FIG. 2C depicts a part formed in accordance with certain aspects of the present disclosure.

FIG. 3 is a simplified schematic of a process and system of forming parts in accordance with certain aspects of the present disclosure.

FIG. 4 is a simplified flow chart of a process of forming parts in accordance with certain aspects of the present disclosure.

FIG. 5A is a part having a gradient compositional profile.

FIG. 5B is a part having a layered compositional profile with abrupt compositional changes.

FIG. 6A is a layered degradable part.

FIG. 6B is a part including a smart material.

FIGS. 7A-7D depict an axial pulse generator used in drilling tools during and after manufacture thereof in accordance with embodiments of the present method.

Figure 8:
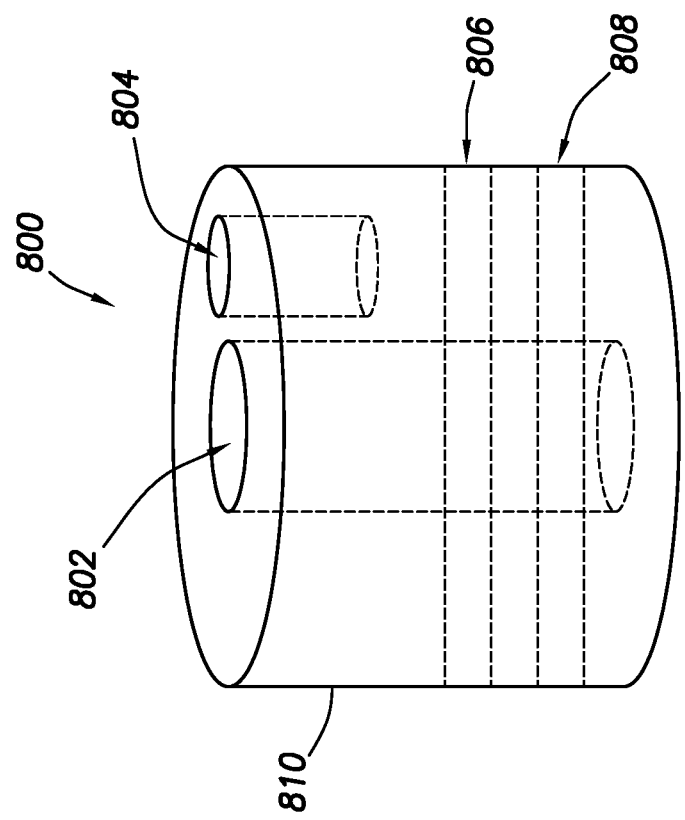
FIG. 8 is a sintered part formed in accordance with embodiments of the present method.

Compositions, articles, systems, and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Certain aspects of the present disclosure include methods and systems of using powder metallurgy in conjunction with additive manufacturing (AM) to form parts, including multi-functional parts. Additionally, the present disclosure includes parts made by these methods, apparatus and systems including such parts, and methods of using such parts, apparatus and systems.

Powder Metallurgy

The methods disclosed herein use powder metallurgy and associated apparatus to form parts. With reference to FIG. 1A, powder metallurgy includes powder production, box 11. Powder production may include selection of powder for use in construction of the parts. The selected powder be a single constituent powder, such as a powder that is 100 percent by weight (wt. %) tungsten carbide. In other aspects, the powder is a mixture of multiple, different powders. Powders suitable for use in the present disclosure for powder metallurgy include, but are not limited to, metal powder, metal alloy powders, ceramic powders (e.g., tungsten carbide), or combinations thereof. When the powder is a mixture of multiple, different powders, powder production may include blending or otherwise mixing the multiple, different powders together. In certain aspects, the methods disclosed herein may be used to build a hybrid part that includes portions that are wholly or predominately metallic, such as greater than 50 wt. % metallic, and portions that are wholly or predominately ceramic, such as greater than 50 wt. % ceramic.

After powder production, powder metallurgy includes powder compaction, box 13. For example, the powder may be deposited into a mold and then subjected to compaction. Powder compaction can include, but is not limited to, pressing the powder with dies, isostatic compaction of the powder, cold isostatic pressing, or other methods known to those skilled in the art.

After compaction, powder metallurgy includes sintering of the compact, box 15. Sintering may include, but is not limited to, liquid phase sintering, electric current assisted sintering, spark plasma sintering, and electro sinter forging. Compaction and sintering results in a consolidation and/or fusing of the particles that make up the powder. Thus, after compaction and sintering, the material is no longer in particulate or powder form, but is a bulk, solid part. In some aspects, formation of the part via powder metallurgy include subjecting the powder material to hot isotactic pressing. While described herein as separate steps, in some aspects compaction and sintering occur and/or are performed concurrently (e.g., simultaneously).

Powder metallurgy may then include any of numerous possible secondary and other finishing steps, box 17, as would be understood by one skilled in the art.

FIGS. 1B-1D are schematics illustrating powder metallurgy. Powder material 32 is dispensed from hopper 30 into mold 34. Within mold 34, powder material 32 is subjected compaction processing, forming compacted powder 38. Compacted powder 38 is then subjected to sintering to form sintered part 42.

One skilled in the art would understand that the above discussion of the powder metallurgy process is for exemplary and explanatory purposes, and that the methods disclosed herein are not limited to performing these particular steps in this particular order. Rather, one skilled in the art would understand that certain steps combined or eliminated and other steps may be added without departing from the scope of this disclosure.

Material Extrusion

The methods disclosed herein use material extrusion and associated apparatus to form molds used in making parts. A simplified representation of a material extrusion process is depicted in FIG. 1E. With reference to FIG. 1E, filament 10a of raw material (e.g., a polymer resin) is dispensed from material spool 12 in a solid state, and is guided by guide 14 to heated extrusion head 16. Within heated extrusion head 16, the raw material is brought from the solid state to a molten state such that the material exits heated extrusion head 16 as molten filament 10b. Heated extrusion head 16 is moved in the x- and y-directions to extrude and deposit molten filament 10b onto platform 18 to successively build part 22 on layer-by-layer basis. As shown, part 22 is supported by support material 24. After a layer is completed, the heated extrusion head 16 or the build platform 18 is moved in the z-direction. One skilled in the art would understand that it is not critical which of the heated extrusion head 16 or build platform 18 moves, and that the process may be implemented by moving any combination of the heated extrusion head 16 or the build platform 18 in any combination of the x-, y-, and z-directions such that the heated extrusion head 16 or the build platform 18 are moved relative to one another.

The materials suitable for use in building the molds by material extrusion, as disclosed herein include polymer resins. In some aspects, the polymer resins include relatively low melting temperature polymers. In some embodiments, the polymer resin is nylon, acrylonitrile butadiene styrene (ABS), polytetrafluoroethylene (PTFE), polyether ether ketone (PEEK), polyetherketoneketon (PEKK), polyphenylene sulfide (PPS), polyamide, polylactic acid (PLA), polyvinyl alcohol (PVA), polycarbonate, a reinforced thermoplastic (e.g., a thermoplastic reinforced with a ceramic, such as sand, carbon, or another component), or another polymer resin. Extrusion is enabled by thermal reduction of the viscosity of the material and, thus, the extrusion temperature will vary depending upon the particular material being extruded. However, some exemplary temperatures include extrusion temperatures of: from about 240° C. to about 270° C. (e.g., for nylon); from about 240° C. to about 300° C. or about 275° C. (e.g., for PTFR); at least about 340° C. (e.g., for PEEK or PEKK); at least about 280° C. (e.g., for PPS), at least about 350° C. (e.g., for polyamide), about 230° C. (e.g., ABS), or below about 230° C. (e.g., for PLA, PVA, and polycarbonate. In some aspects, the extrusion temperature ranges from about 150° C. to 450° C., or from about 200° C. to about 400° C., or from about 250° C. to about 350° C., or anywhere therebetween. In some aspects, the melting temperature of the extruded material (e.g., thermoplastic) will be less than 500° C., or less than 450° C., or less than 400° C., or less than 350° C., or less than 300° C., or less than 250° C.

FIG. 1F is a simplified schematic of a material extrusion process, including dispensing filament, box 41; melting filament, box 43; extruding melted filament, box 45; and depositing extruded filament, box 47.

One skilled in the art would understand that the above discussion of the material extrusion process is for exemplary and explanatory purposes, and that the methods disclosed herein are not limited to performing these particular steps in this particular order. Rather, one skilled in the art would understand that certain steps combined or eliminated and other steps may be added without departing from the scope of this disclosure.

Combining Powder Metallurgy with Material Extrusion

The present disclosure provides for a method and system for forming parts using both powder metallurgy and additive manufacturing processes and apparatus. FIG. 2A depicts one exemplary schematic of a system that includes both powder metallurgy apparatus and additive manufacturing apparatus. System 200 may be used to build a "green part", that is, a part that is formed and compacted to have the same shape and size, or at least substantially the same shape and size, as the final, deployable part, but is not yet processed to a final state (e.g., a final density and/or strength) that is typically suitable for deployment and service of the part.

System 200 includes least two heads, including at least one head for the 3D printing (i.e., extrusion head 206) a mold and at least one other head (i.e., deposition head 216) for powder deposition in a powder metallurgy process of forming a final part. Each such head of system 200 may be capable of and programmed to articulate along three axes (i.e., the x-, y- and z-axis). As discussed in more detail below, the position of each such head along the three axes and the usage of each head (e.g., when and where material is extruded or deposited) may be controlled and coordinated using computer software and electronics.

The powder metallurgy and material extrusion system, system 200, includes material extrusion apparatus 201 and powder metallurgy apparatus 203. Material extrusion apparatus 201 and powder metallurgy apparatus 203 are arranged in positional relationship with one another such that the apparatus may be used to form mold portions 208*a*-208*c* and to form part portions 209*a*-209*c* or layers 212*b* and 214*b* thereof, respectively, as is described in more detail below.

Material extrusion apparatus 201 includes material spool 205 having filament 202*a* (e.g., polymer filament) of a material spooled thereon. Material extrusion apparatus 201 includes extrusion head 206. Extrusion head 206 is positioned to receive filament 202*a*, which is fed into extrusion head 206 from guide 241. Extrusion head 206 is heated, such that the material of filament 202*a* becomes molten within extrusion head 206 or at least upon exit from nozzle 207 of extrusion head 206. Thus, the material of filament 202*a* exits nozzle 207 as molten filament 202*b*. Extrusion head 206 is capable of moving in the x-, y-, and z-directions. In operation, while extruding molten filament 202*b*, extrusion head 206 moves in the x- and y-directions to deposit a layer of the material of molten filament 202*b* within a plane defined in the x- and y-directions. After deposition of a layer of the material of molten filament 202*b* within a plane defined in the x- and y-directions, extrusion head 206 moves in the z-direction to deposit another layer of the material of molten filament 202*b* within a plane defined in the x- and y-directions. This subsequent layer is deposited on top of the former layer. Extrusion head 206 may be programmed (as discussed in more detail below) to deposit extruded molten filament 202*b* at only the positions along the x-, y-, and z-directions that correspond with a portion of the mold to be formed. As such, material extrusion apparatus 201 is used to build mold portions 208*a*-208*c* on a layer-by-layer basis on build platform 218. As shown in FIG. 2A, mold portions 208*a* are completely formed mold portions that surround built part portions 209*a* and 209*b* of the part, and mold portion 208*b* is in the process of being formed by deposition of extruded molten filament 202*b*. Mold portion 208*b* surrounds the deposited portions of material of unbuilt portion 209*b* of the part. Also shown, in hidden lines, is mold portion 208*c*, which has not been formed yet.

Powder metallurgy apparatus 203 includes first hopper 210*a* containing first powder (or powder mixture) 212*a*, and second hopper 210*b* containing second powder (or powder mixture) 214*a*. Powder metallurgy apparatus 203 includes deposition head 216, including deposition nozzle 217. First hopper 210*a* and second hopper 210*b* are arranged in positional relationship with one another and with deposition head 216 such that first hopper 210*a* and second hopper 210*b* dispense first powder 212*a* and second powder 212*b*, respectively, into deposition head 216. Deposition head 216 is capable of moving in the x-, y-, and z-directions. In operation, while depositing powder 223, deposition head 216 moves in the x- and y-directions to deposit a layer or zone of the powder 223. After deposition of powder 223, deposition head 216 may move in the z-direction to deposit another layer or zone of powder 223, which may be deposited on top of the previously deposited powder. For example, formed portion 209*a* of the part is depicted as including at least two layers. A first layer of formed portion 209*a* of the part includes second material 214*b*, and a second layer of formed portion 209*a* of the part includes first material 212*b*. First and second layers of formed portion 209*a* of the part may be bonded together. Formed parts may also be formed of the same material throughout. For example, formed portion 209*b* of the part is depicted as a single layer part including first material 212*b*. Deposition head 216 may also operate to deposit different powders or mixtures at different positions within the same x-y plane, such that deposition head 216 deposits powder 223 in one zone in an x-y plane, and then deposition head 216 moves in the x- and y-direction within that same x-y plane and deposits another powder or mixture in a different zone within that same x-y plane. For example, FIG. 2C depicts a top view of a part 209*d* composed of different compositions 215*a* and 215*b* located in different zones within part 209*d* within the x-y plane. Thus, the composition and properties of a formed part, from layer to layer and within each layer, may be varied using the powder metallurgy process disclosed herein. Deposited powder 223 may be first powder 212*a*, second powder 214*a*, or a mixture thereof. Deposition head 216 may be programmed (as discussed in more detail below) to deposit powder 223 at only the positions along the x-, y-, and z-directions that correspond with a portion of the part to be formed. As such, powder metallurgy apparatus 203 is used to build parts (e.g., portions of part 209*a*, 209*b*, and 209*c*) on a layer-by-layer basis.

As shown in FIG. 2A, mold portions 208*a* are completely formed mold portions that surround built part portions 209*a* and 209*b*, and mold portion 208*b* is in the process of being formed by deposition of the material of extruded molten filament 202*b*. Mold portion 208*a* surrounds the built part portion 209*a*, and mold portion 208*b* surrounds built part portion 209b. The formed portions of mold 208c surround the deposited portions of powder of unbuilt part portion 209c. Also shown, in hidden lines, is mold portion 208c, which has not been formed yet.

In certain aspects, material extrusion apparatus 201 and powder metallurgy apparatus 203 operate concurrently to form mold portions 208a-208c and part portions 209a-209c (or layers thereof), respectively. In some such aspects, the concurrent operation of material extrusion apparatus 201 and powder metallurgy apparatus 203 includes simultaneously building the mold using material extrusion apparatus 201 and the part using powder metallurgy apparatus 203. That is, the extrusion head 206 and deposition head 216 simultaneously extrude and deposit, respectively, the extruded filament 202b and powder 223, respectively. Thus, as a layer of mold is formed by material extrusion, a layer of powder material is concurrently deposited therein. In other such aspects, the concurrent operation of material extrusion apparatus 201 and powder metallurgy apparatus 203 includes sequential cycles of operation of the material extrusion apparatus 201 and powder metallurgy apparatus 203. That is, the extrusion head 206 extrudes the extruded filament 202b to form a portion (e.g., layer) of the mold, followed by the deposition head 216 depositing powder to form a portion (e.g., layer) of the part, subsequently followed by the extrusion head 206 extruding the extruded filament 202b to form another portion (e.g., layer) of the mold, and so forth until the part and mold are fully built. Thus, in at least some aspects, the mold is not full built upon the beginning of powder deposition by deposition head 216. In other aspects, the mold may be built via 3D printing prior to building the part within the mold via powder metallurgy.

FIG. 2B depicts a top view of an exemplary mold, including built mold portion 208d and unbuilt mold portion 208e. Using the material extrusion process disclosed herein, the mold may be constructed to have various features, including features of complex geometry. The molds disclosed herein may, thus, be used to build parts having various features, including features of complex geometry. As shown in FIG. 2B, mold 208d includes mold body 222 having holes 220 defining space where powder is not deposited when forming a part.

In some aspects, material extrusion apparatus 201 includes controller 211 in electronic and/or data communication with one or more portions of material extrusion apparatus 201, such as with material spool 205 and/or extruder head 206 and/or build platform 218. Controller 211 may control operation and movement of material spool 205, extruder head 206 and build platform 218 through the use of software with control algorithms and data and/or control signals transmitted to material spool 205, extruder head 206, and build platform 218. For example, controller 211 may have a CAD design file (STL file) that defines the size, shape and position of molds, such that controller 211 controls the dispensing of material from spool 205, the extrusion of material from head 206, and the position of head 206 and build platform 218 based on the CAD design file of the mold.

In some aspects, powder metallurgy apparatus 203 includes controller 231 in electronic and/or data communication with one or more portions of powder metallurgy apparatus 203, such as with material hoppers 210a and 210b and/or head 216. Controller 231 may control operation and movement of hoppers 210a and 210b and head 216 through the use of software with control algorithms and data and/or control signals transmitted to hoppers 210a and 210b and head 216. For example, controller 231 may have a CAD design file (STL file) that defines the size, shape, composition of, and position of part, such that controller 231 controls the dispensing of powder from hoppers 210a and 210b, the deposition of powder from head 216, and the position of head 216 based on the CAD design file of the part.

While material extrusion apparatus 201 and powder metallurgy apparatus 203 are shown as including separate controllers, controllers 211 and 231, one skilled in the art would understand that the same controller may be used to control both material extrusion apparatus 201 and powder metallurgy apparatus 203 and to coordinate the operations thereof. Furthermore, in embodiments with two controllers, as shown in FIG. 2A, the two controllers may be in communication (e.g., data communication) such that operations controlled by the two controllers may be coordinated, or the two controllers may be programmed such that operations of material extrusion apparatus 201 and powder metallurgy apparatus 203 are coordinated.

One skilled in the art would understand that the powder metallurgy and material extrusion system and method of use described with reference to FIG. 2A is for exemplary and explanatory purposes, and that the systems and methods disclosed herein are not limited to inclusion of these particular parts, steps, or arrangement of parts and steps. Rather, one skilled in the art would understand that certain parts or steps may be combined or eliminated and other parts or steps may be added without departing from the scope of this disclosure. For example, the powder metallurgy and material extrusion system may include more than one material extrusion head, more than one powder deposition head, and more or less than two hoppers (or any other powder dispensing apparatus). Furthermore, other particular equipment may be used to concurrently form the mold and part therein.

Sintering

After forming the "green parts", as shown in FIG. 2A, the molded green part is subjected to conditions (e.g., temperature and/or pressure conditions) that result in the fusing of the particles of the compacted power material, such that a consolidated, bulk, solid part is formed. For example, in some such aspects, the molded green part is subjected to sintering to fuse the particles of the compacted power material and form the solid part. The sintering may include subjecting the molded green part to hot isostatic pressing (HIP), where the molded green part is heated, such as in an oven, at a suitable process temperature that facilitates the fusion of the powder material. One skilled in the art would understand that the particular temperature or temperature range suitable for fusing the powder material may vary depending on, for example, the composition of the powder.

The conditions (e.g., temperature and/or pressure) suitable for fusing the particles of the compacted power material together are also suitable for separating the mold from the green part. For example, the conditions (e.g., temperature and/or pressure) suitable for fusing the particles of the compacted power material together may also be suitable for melting and/or evaporating and/or burning the mold from the green part. As such, during subjection of the molded green part to conditions that result in the fusing of the particles of the compacted power material, the material of which the mold is composed (e.g., polymer resin) is removed (e.g., melted and/or evaporated and/or burned) from the green part. The material of which the mold is composed may be selected to be a material that melts and/or evaporates and/or burns at a relatively lower temperature in comparison to the temperature at which the powder material would melt and/or evaporate and/or burn. The material of which the mold is composed may melt and/or evaporate and/or burn at a lower temperature than the sintering temperature of the powder material. Thus, while heating the molded green part to sinter the green part, but prior to the sintering of the powder material occurring, the mold melts and/or evaporates and/or burns away from the part. As such, in some aspects, the material of which the mold is composed does not fuse, or at least does not substantially fuse, with the powder material during such fusion (e.g., sintering) processing. In some aspects, after the outside shell material (mold) melts or at least begins melting, pressure may be increased to hold and fuse the powder material at a temperature that is higher than that at which the mold begins to melt. As would be understood by one skilled in the art, the temperature and pressure conditions at which a part is sintered varies depending upon the material being sintered. For example, to sinter a part from certain nickel alloys, temperatures of about 2150° F. and pressures of about 10,000 psi may be used to sinter the material into a part. During HIP processing, the molded green part is subjected to hydrostatic pressures via addition of an inert gas, which facilitates proper fusion of the powder materials and reduces or eliminates porosity in the final, formed part. Using these methods, a final, formed part is thus produced, and may be subjected to one or more standard post-processing steps. While HIP processing has been specifically described, one skilled in the art would understand that sintering may include liquid phase sintering, electric current assisted sintering, spark plasma sintering, electro sinter forging, or other suitable sintering processes. As the mold is removed via melting and/or evaporation and/or burning, the present methods reduce or eliminate the use of machining for removal of the mold from the part. As would be understood by one skilled in the art, the temperature at which the mold material is decomposed will vary depending upon the pressure and the particular material. Decomposition (e.g., melting, evaporation, burning) of the mold material is facilitated at low pressures, including vacuum. For example, a mold of PTFE will degrade at temperatures above about 360° C., such as 500° C.

With reference to FIG. 3, an exemplary sintering process is shown and described. First, molded green part 317, including part 309 and mold 308, is placed into sintering apparatus 399 (e.g., an oven). Within sintering apparatus 399, molded green part 317 is subjected to temperature and/or pressure conditions 397 that result in the fusing of the particles of the compacted power material, such that a consolidated, bulk, solid part 319 is formed and mold 308 is degraded to melted and/or evaporated and/or burned material 318. Consolidated, bulk, solid part 319 may then be removed from sintering apparatus 399 and optionally subjected to standard post-processing steps 395 to form final, finished part 321 suitable for deployment and service in the field, such as in a downhole environment.

As would be understood by one skilled in the art, the temperature at which a part sinters will vary depending on the particular material being sintered. For example, sintering tungsten carbide with at least 6 to 40 wt. % of a metal binder will vary depending upon the particular metal binder. Temperatures above about 1400° F. will sinter tungsten carbide with 6 to 40 wt. % of a copper binder, temperatures above about 2000° F. (e.g., 2000 to 3000° F.) will sinter tungsten carbide with 6 to 40 wt. % of a nickel and cobalt binder. The sintering may occur in an inert atmosphere, including at vacuum conditions. In HIP processing, pressurizing results in a reduced porosity, promotes flow, and results in better material properties, including transverse rupture strength of the resulting part. Sintering pressures during HIP processing may be as high as 30,000 psi for carbides. In other aspects, the pressures during HIP processing may be from about 10,000 to about 15,000 psi. One skilled in the art would understand that the pressured used during HIP processing may vary depending upon the particular materials and desired results.

One skilled in the art would understand that the above discussion of the sintering process is for exemplary and explanatory purposes, and that the methods disclosed herein are not limited to performing these particular steps in this particular order. Rather, one skilled in the art would understand that certain steps combined or eliminated and other steps may be added without departing from the scope of this disclosure.

Designing and Building Parts and Molds

FIG. 4 is a flow chart of steps of the present method. Method 400 of building a part includes "part model and software coordination", box 410. For example, a model of a part (part model), including the necessary material content thereof, may be identified, designed, and developed using computer aided design (CAD) software. The features of a mold necessary to form the part may be extracted from the thus designed CAD model of the part to form a corresponding CAD model of the mold that has an internal contour that matches the external contour of the part. The CAD model of the mold may be transmitted to, formed within, or otherwise input into 3D printer equipment including 3D printer software (e.g., transmitted to computer/controller 211 that controls the extruder head 206). The material composition identified as suitable for forming the part may be fed into the powder metallurgy apparatus (e.g., into hoppers 210a and 210b of apparatus 203).

Method 400 includes, equipment layering and green part build, box 420. The powder materials are fed by the powder nozzle (e.g., nozzle 217) from the hoppers into the formed portions of the mold. The outside wall features, that is the mold, is 3D printed by operation of the filament nozzle (e.g., nozzle 207) depositing molten material (e.g., molten polymer) to form the walls of the mold, which contains the deposited powder. The building of the part and mold is performed on a layer-by-layer basis. For example, in some such aspects, each successive layer built has a thickness ranging from 20 to 100 microns. One skilled in the art would understand that the layers may have thickness outside of this range, including thickness less than 20 microns and thickness greater than 100 microns, depending on the particular application. In operation, the 3D printing software of the controller(s) of the material extrusion apparatus and powder metallurgy apparatus defines and controls, via controlling the heads 206 and 216 and associated equipment, the successive layering of the mold and successive deposition of the powder material required per layer of the mold. Such 3D printing software may function to sequence the coordination of the heads 206 and 216, as required.

The method 400 includes powder sintering/HIP, box 430. The molded, green part is subjected to sintering or HIP processing for fusion of the powder materials. During sintering or HIP processing, the temperature is at the sintering/melting temperature of the powder or infiltrate to cause fusion thereof. Pressure may also be applied during sintering or HIP processing to enable fusion of the powders and remove porosities in the part. During the sintering process, the relatively low-temperature mold material melts and/or evaporates and/or burns; thereby, exposing the powder material and enabling and/or facilitating fusion of the powder material to obtain the final sintered part, box 440. Thus, the entire molded part (i.e., the mold and the part, together) may be post-processed by sintering, including hot isostatic pressing, such that the mold is burned off, melted of, and/or evaporated off of the consolidated powder to form the solid part.

The method disclosed herein provides for the concurrent, layer-by-layer powder metallurgy and material extrusion for concurrent fabrication of molds and molded parts. With 3D printing of the mold, the method provides for the formation of parts, such as tools, of relatively complicated shapes, nested shapes, and lattice structures. With the powder deposition controlled separately from control of the material extrusion, different powder materials can be deposited in different layers and distributed across different positions within a part. Changes in the composition of the powder deposited, if used, can be gradient changes, such that the part formed thereby has a gradient compositional profile. For example, FIG. 5A depicts part 509a having a gradient compositional profile, where the composition of part 509a gradually changes along the part 509a in at least one direction, from material 571 to material 573. Also, changes in the composition of the powder deposited, if used, can be abrupt, step changes, such that the part formed thereby can has abrupt changes in composition. For example, FIG. 5B depicts part 509b having a compositional profile with abrupt changes, where the composition of part 509b abruptly changes along the part 509b in at least one direction, from material 571 to material 573, forming layers or zones composed of material 571 that are discrete from layers or zones composed of material 573. One skilled in the art would understand that the compositional profile may be varied in many different ways to produce parts of homogenous composition, inhomogeneous composition, continuous phase/discontinuous phase composition, or other variations in compositional make up and constituency. Thus, the present disclosure provides for systems and methods for building, layer-by-layer, a mold contour using 3D printing and concurrently filling the mold with powder, such that the composition of each layer is customizable. The method may be implemented, in some aspects, to construct tailored, precise parts, such as oilfield parts, relatively quickly and at a relatively low costs in comparison to at least some other additive manufacturing processes.

One skilled in the art would understand that the above discussion of the method is for exemplary and explanatory purposes, and that the methods disclosed herein are not limited to performing these particular steps in this particular order. Rather, one skilled in the art would understand that certain steps combined or eliminated and other steps may be added without departing from the scope of this disclosure.

Parts

The methods disclosed herein may be used to form any number of different types of parts of varying compositions, shapes, sizes, and properties. The methods disclosed herein may be used to form cutting bits, piezoelectric sensing parts, composite parts, graded material parts, axial pulse generators, drill bits, bearings, impellers/diffusers, turbines, flow diverters, or other oilfield tools and components. In some embodiments, the part may be a multi-functional part formed to exhibit wear and/or corrosion resistant. While discussed primarily with respect to oilfield parts and oilfield-related applications, one skilled in the art would understand that the present methods and systems are not limited to being used in the formation of such oilfield-related parts, and may be used to other parts for other applications.

In some aspects, the parts formed in accordance with the present disclosure include rotating parts, such as bits, bearing, bushings, thrusts washers, turbines, cutters (i.e., bits included for coring), rotors, stators, blenders, mixers, gears, cams, pump stages, shafts, and sleeves. The parts formed in accordance with the present disclosure may include non-rotating parts, such as wear bands, pads, stabilizers, centralizers, collars (e.g., drill collars), fasteners (e.g., nuts and bolts), threaded rings, valve seats, inserts, seals (e.g., face seals), sucker rods, collets, anchors, mandrels, housings, tubulars, protectors, connectors, ferrules, pins, nozzles, screens and filters, and heat exchangers.

Exemplary Parts—Degradable

The methods disclosed herein may be used to form degradable parts for use in downhole environments. For example, the powder material may be a degradable material, such as a degradable metal, degradable ceramic, or degradable composite. In some such aspects, layered structures of materials with different electrical potentials are built using the methods disclosed herein. Such methods may include formation of the mold via 3D printing and, concurrently with the formation of the mold, depositing a layer of a first material followed by depositing a layer of a second material, with the first and second materials characterized as having different electrochemical potentials, such that the part made therefrom degrades galvanically in water-based environments. Thus, the methods disclosed herein may be used to produce graded materials that are degradable in water-based environments, including a layer of an anode material, followed by a layer of a cathode material and/or a layer of blended of powers that contain both anodes and cathodes. FIG. 6A shows such a part 602, formed of first material 601 and second material 603 having different electrochemical potentials. One skilled in the art would understand that the selection and number of materials, and the shape of the part may be modified depending on the particular application. Part 602, as shown in FIG. 6A, is depicted for exemplary purposes.

Exemplary Parts—Smart

In some aspects, the methods disclosed herein may be used to form "smart parts". As used herein, a "smart part" is a part composed at least partially or fully of at least one "smart material." One skilled in the art would understand that a smart material is a material that exhibits at least one property that is responsive, in a controlled manner, to external conditions, including stress, temperature, moisture, pH, electric fields, or magnetic fields, light, or chemical compounds. To form a smart part, a powder of a smart material may be deposited and processed via powder metallurgy methods in accordance with the present discourse. Such smart parts may include, but are not limited to, pressure sensitive smart parts, such as valves that open and close, leading to changes in pressure and resulting in the formation of electrical signals via piezoelectric signals. In some aspects, the smart materials include piezoelectric cement-based materials, or polymeric materials. In certain aspects, piezoelectric ceramic powders may be deposited within a matrix material to form a smart part that is sensitive to pressure. FIG. 6B shows such a part 612, formed of non-smart material 611 and smart material 613. One skilled in the art would understand part 612, as shown in FIG. 6B, is depicted for exemplary purposes.

Parts—Exemplary Parts

FIGS. 7A-7D illustrate the successive buildup of one exemplary part, an axial pulse generator 700d for use in drilling tools, via powder metallurgy methods concurrently with the successive buildup of the associated mold 701 via 3D printing. In FIGS. 7A-7D, the part and mold are shown in isolation from the systems used to build the part and mold. One skilled in the art would understand that the present methods are not limited to construction of axial pulse generators, and may be used to form other parts for other applications.

Figure 7D:
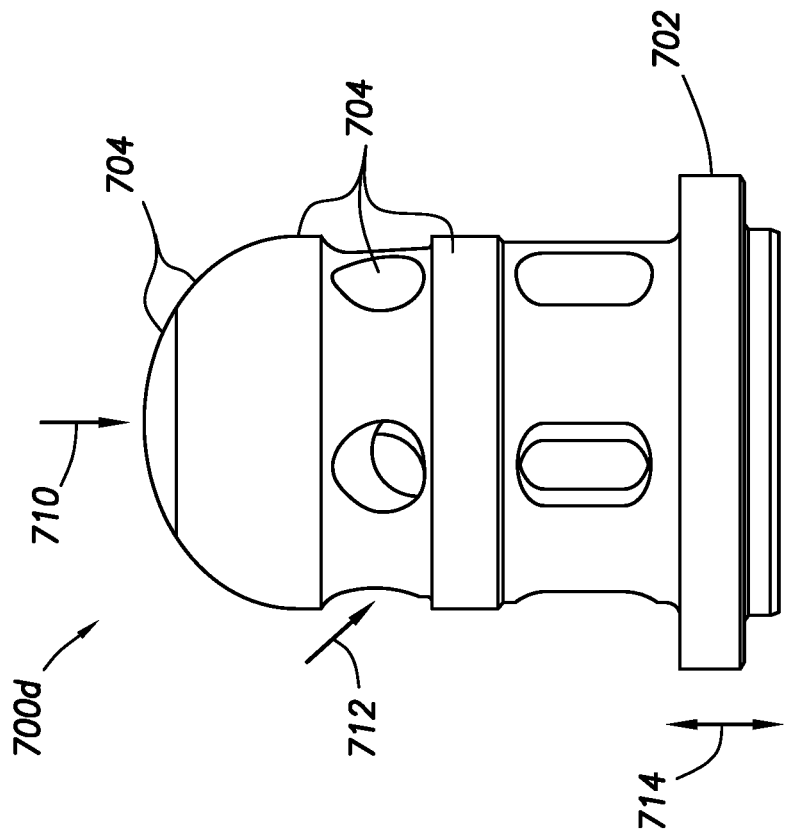

With reference to FIGS. 7A-7D, axial pulse generator 700*a* is shown partially constructed in FIG. 7A with mold 701 partially constructed and a first material 702 deposited to fill the void defined by the, thus far, constructed portions of mold 701. FIG. 7B depicts axial pulse generator 700*b* and associated mold 701 further constructed relative to FIG. 7A, and FIG. 7C is a cross-sectional view of FIG. 7B. Portions of mold 701 have first material 702 deposited therein to fill the void defined by those portions of mold 701, and other portions of mold have second material 704 deposited therein to fill the void defined by those portions of mold 701 not filed by first material 702. FIG. 7C also indicates the remaining portions 706 (hidden lines) of the axial pulse generator 700*c* and mold 701 that need to be built to compete construction of the part. FIG. 7D depicts the completed part, axial pulse generator 700*d* after completion of construction and removal of the mold 701. Also indicated are the fluid flow lines 710 and 712 through axial pulse generator 700*d* and the axial movement 714 of the axial pulse generator 700*d*. First material 702 and second material 704 may be selected to have desired properties, depending on the particular application. Furthermore, the position of each material within axial pulse generator 700*d* may be selected depending on the particular application, such as the expected conditions for which the part or that portion of the part will be subjected to in a downhole environment. For example, and without limitation, first material 702 may be a relatively tough material selected to provide impact resistance to the portions of axial pulse generator 700*d* composed of first material 702, and second material 704 may be a relatively hard material selected to provide erosion and/or wear resistance to the portions of axial pulse generator 700*d* composed of second material 704. Thus, in this exemplary scenario, it is required or desired that axial pulse generator 700*d* be composed of a relativize hard material for wear/erosion resistance on the fluid flow side, and of a relatively tough material capable of withstanding impacts due to the flow pulsations at other locations.

As such, each portion of a part may be designed and built to exhibit a different property and/or to provide a different functionality to the part. Each portion of a part may be designed and built to exhibit thermal, electrical, mechanical, chemical, and any other physical property that is the same as or different than other portions of the part. For example, some portions of a part may include a smart material while other portions do not include a smart material, some portions of a part may include a degradable material while other portions do not include a degradable material, some portions of a part may include a thermal insulator while other portions include a thermal conductor, and some portions of a part may include an electrical insulator while other portions include an electrical conductor. One skilled in the art would understand that the number and type of such property variations within a part may depend on the particular application of the part.

FIG. 8 depicts another, final, sintered part 800 in accordance with some aspects of the present disclosure. Part 800 includes through-hole 802, blind hole 804, through-hole 806, and through-hole 808, each positioned through body 810 of part 800. FIG. 8 illustrates some of the complex features that can be integrally built into the parts in accordance with the present disclosure. FIG. 8 is representative of the final form of the part shown being manufactured in FIG. 2A.

Applications

The method disclosed herein may be used to design and produce parts having improved functionality at a cost and rate of production that is, in at least some aspects, superior to that attainable by conventional additive manufacturing techniques. In some aspects, the methods disclosed herein are used to manufacture oilfield tools capable of being subjected to relatively harsh operating conditions while fulfilling multiple functionalities without failure of the oilfield tool, such as corrosion resistance, wear resistance, the ability to bear relatively heavy loads, the ability to bear relatively heavy/high impacts, or combinations thereof. The manufacturing methods disclosed herein may be used to form parts that are composed of multiple, different materials at desired locations to meet the desired functional requirements of the part. The methods and systems disclosed herein may also be applied to other, non-oilfield related applications.

Equipment

Certain aspects of the present disclosure relate to equipment, including systems and/or apparatus suitable for forming parts in accordance with the methods disclosed herein. The system may include at least one material extrusion head that moves on a 3-axis, enabling the building of a mold wall by controlled extrusion of heated polymer through a nozzle. The system may include at least one powder deposition head that moves on a 3-axis that dispenses a powder material or desired combination of powders from at least one or multiple powder dispensers (e.g., hoppers). The system may include software and control electronics that facilitate the building of the final green part, such as by slicing the CAD model of the part suitably, layer-by-layer, and creating the mold and powder location features. As used herein, 'slicing the CAD model" refers to apportioning a 3D CAD model of the part and/or the mold into sections or layers that correspond with the layers of the part and mold to be built using the system disclosed herein (e.g., CAD model sections that correspond with a 20-100 micron layers of the mold and part to be built). As such, the system builds a first layer of the mold and part in accordance with a first slice of the 3D CAD model of the mold and part, and subsequently builds a second layer of the mold and part in accordance with a second slice of the 3D CAD model of the mold and part, as so forth until the mold and part are fully built in accordance with the full 3D CAD model of the mold and part. The software and control electronics control the movement and position of the nozzle heads, control the extrusion of the material to build the mold wall, and control the powder deposition, all based on the CAD model(s) and on a layer-by-layer (and CAD model slice-by-CAD model slice) basis. One skilled in the art would understand that the system disclosed herein may include additional features, apparatus, and parts, and is not limited to these particular components.

Method of Using Parts

Certain aspects of the present disclosure provide for a method of using a part formed in accordance with the present disclosure. The method includes providing a part formed in accordance the methods disclosed herein, and deploying the part, such as in a downhole environment.

Green Molded Part

Some aspects of the present disclosure provide for a molded green part. The molded green part includes a powder material (e.g., a compacted powder material) molded by a polymeric mold. The polymeric mold is formed via 3D printing, and the powder material is deposited therein via powder metallurgy techniques.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method of making a part using powder metallurgy and material extrusion, the method comprising:
    forming a mold of a first material using material extrusion;
    depositing a second material within the mold, wherein the second material is deposited into the mold in powder form;
    compacting the second material within the mold;
    heating the mold and the second material within the mold, wherein, during the heating the mold is separated from the second material by melting, evaporating, burning, or combinations thereof of the first material, and wherein during the heating the second material is sintered; and
    obtaining a part.

2. The method of claim 1, the sintering includes hot isostatic pressing.

3. The method of claim 1, wherein the first material melts, evaporates, burns, or combinations thereof at a lower temperature than the temperature at which the second material sinters.

4. The method of claim 1, wherein the first material is a polymer resin, and wherein second material is a metal powder, a metal alloy powder, a ceramic powder, or combinations thereof.

5. The method of claim 1, wherein the method includes extruding the first material from at least one extrusion head to form the mold, and depositing the second material from at least one deposition head into the mold.

6. The method of claim 5, wherein the method includes articulating the at least one extrusion head along three axes during extrusion of the first material, and articulating the at least one deposition head along three axes during deposition of the second material.

7. The method of claim 1, wherein the forming of the mold and the deposition of the second material are performed concurrently.

8. The method of claim 7, wherein the method includes concurrent extrusion of the first material and deposition of the second material, including extruding the first material to form the mold while simultaneously depositing the second material into formed portions of the mold.

9. The method of claim 7, wherein the method includes concurrent extrusion of the first material and deposition of the second material, including sequential cycles of extrusion of the first material to form a portion of the mold and deposition of the second material into the formed portion of the mold.

10. The method of claim 1, wherein the mold is formed layer-by-layer and the second material is deposited layer-by-layer, including:
    extruding first layer of the first material to form a first portion of the mold;
    depositing a first portion of the second material within the first portion of the mold;
    extruding second layer of the first material to form a second portion of the mold; and
    depositing a second portion of the second material within the second portion of the mold.

11. The method of claim 1, wherein the part is at least partially degradable, and wherein the second material is a degradable material.

12. The method of claim 1, the part is a smart part, and wherein the second material is a smart material.

13. The method of claim 1, wherein the part is a cutting bit, a piezoelectric sensing pars, a composite part, a graded material part, an axial pulse generator, a drill bit, a bearing, an impeller/diffuser, a turbine, a flow diverter, a bushing, a thrust washer, a rotor, a stator, a blender, a mixer, a gear, a cam, a pump stage, a shaft, a sleeve, a wear band, a pad, a stabilizer, a centralizer, a collar, a fastener, a threaded ring, a valve seat, an insert, a seal, a sucker rod, a collet, an anchor, a mandrel, a housing, a tubular, a protector, a connector, a ferrule, a pin, a nozzle, a screen, a filter, or a heat exchanger.

14. The method of claim 1, wherein a third material is deposited into the mold, and wherein the second material and the third material exhibit different properties.

15. The method of claim 14, wherein the third material is deposited in a different position within the mold than the second material.

16. A method of making a part using powder metallurgy and material extrusion, the method comprising:
    forming a mold of a first material by extruding the first material;
    depositing a second material into the mold, wherein multiple layers of the second material are deposited in the form of a powder;
    heating the mold and the second material within the mold, wherein, during the heating the mold is separated from the second material by melting, evaporating, burning, or combinations thereof of the first material;
    after the mold is separated from the second material, increasing pressure and temperature on the second material, wherein during the heating the second material is sintered; and
    obtaining a part, the part comprising the second material.

17. The method of claim 16, wherein depositing the second material into the mold comprises:
    depositing a first layer of the second material in powder form into the mold; and
    depositing a second layer of the second material in powder form into the mold, wherein the second layer is deposited onto the first layer.

18. The method of claim 1, wherein the second material is deposited from a hopper into the mold.

19. The method of claim 1, wherein, after the mold is separated from the second material, pressure and temperature on the second material are increased.

20. A method of making a part using powder metallurgy and material extrusion, the method comprising:
    extruding a first material into the form of a mold;
    depositing a particulate, in powder form, into the mold, wherein the particulate is a metal or ceramic powder;
    compacting the metal or ceramic powder within the mold;

heating the mold and the metal or ceramic powder within the mold, wherein, during the heating the mold is separated from the metal or ceramic powder by melting, evaporating, burning, or combinations thereof of the first material, and wherein during the heating the metal or ceramic powder is sintered; and obtaining a part, the part comprising the sintered metal or ceramic powder.

* * * * *